United States Patent
Cottrille

(10) Patent No.: US 7,913,167 B2
(45) Date of Patent: Mar. 22, 2011

(54) SELECTIVE DOCUMENT REDACTION

(75) Inventor: Scott C. Cottrille, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 687 days.

(21) Appl. No.: 11/960,522

(22) Filed: Dec. 19, 2007

(65) Prior Publication Data

US 2009/0164878 A1     Jun. 25, 2009

(51) Int. Cl.
*G06F 17/21* (2006.01)

(52) U.S. Cl. ......................................................... 715/271

(58) Field of Classification Search .................... 715/271
See application file for complete search history.

(56) References Cited

U.S. PATENT DOCUMENTS

| | | | | |
|---|---|---|---|---|
| 5,581,682 | A * | 12/1996 | Anderson et al. | 715/236 |
| 7,802,305 | B1 * | 9/2010 | Leeds | 726/26 |
| 2003/0115481 | A1 * | 6/2003 | Baird et al. | 713/201 |
| 2006/0026502 | A1 | 2/2006 | Dutta | |
| 2006/0075228 | A1 * | 4/2006 | Black et al. | 713/167 |
| 2006/0178997 | A1 | 8/2006 | Schneck et al. | |
| 2006/0206462 | A1 | 9/2006 | Barber | |
| 2006/0218149 | A1 * | 9/2006 | Patrick | 707/9 |
| 2006/0242558 | A1 * | 10/2006 | Racovolis et al. | 715/511 |
| 2006/0259614 | A1 * | 11/2006 | Patrick | 709/224 |
| 2006/0259954 | A1 * | 11/2006 | Patrick | 726/2 |
| 2006/0259977 | A1 * | 11/2006 | Patrick | 726/26 |
| 2006/0259983 | A1 | 11/2006 | Sperry | |
| 2006/0277220 | A1 * | 12/2006 | Patrick et al. | 707/200 |
| 2007/0030528 | A1 * | 2/2007 | Quaeler et al. | 358/453 |
| 2007/0056034 | A1 * | 3/2007 | Fernstrom | 726/20 |
| 2007/0094594 | A1 * | 4/2007 | Matichuk et al. | 715/530 |
| 2008/0016341 | A1 * | 1/2008 | Staddon et al. | 713/165 |
| 2008/0016372 | A1 * | 1/2008 | Staddon et al. | 713/189 |
| 2008/0046757 | A1 * | 2/2008 | Staddon et al. | 713/189 |
| 2008/0072290 | A1 * | 3/2008 | Metzer et al. | 726/3 |
| 2008/0204788 | A1 * | 8/2008 | Kelly et al. | 358/1.15 |

(Continued)

FOREIGN PATENT DOCUMENTS

WO    WO2006041318 A1    4/2006

(Continued)

OTHER PUBLICATIONS

Choudhri et al., Patientservice: Electronic Patient Record Redaction and Delivery in Pervasive Environments, p. 41-47 (Proceedings of the 5th Intenational Workshop on Enterprise Networking and Computing in Healthcare Industry 2003, Healthcom 2003, Jun. 6-7, 2003).*

(Continued)

*Primary Examiner* — Doug Hutton
*Assistant Examiner* — Frank D Mills
(74) *Attorney, Agent, or Firm* — Workman Nydegger

(57) ABSTRACT

Embodiments described herein are directed to selectively redacting and unredacting display information in accordance with a redaction policy. In one embodiment, a computer system receives user input indicating a user's intention to selectively redact portions of accessed documents. The computer system accesses at least one document, such that the document is capable of being displayed to the user. The computer system determines that the accessed document comprises one or more tags indicating which portions of the document are to be redacted. The computer system dynamically redacts those portions of the document identified by the tags without otherwise altering the structure of the document, in accordance with the user's intention. The computer system also displays the document according to the document's original structure, omitting the dynamically redacted portions.

21 Claims, 3 Drawing Sheets

U.S. PATENT DOCUMENTS

| | | | |
|---|---|---|---|
| 2009/0019379 A1* | 1/2009 | Pendergast et al. | 715/762 |
| 2009/0025063 A1* | 1/2009 | Thomas | 726/4 |
| 2009/0070881 A1* | 3/2009 | Yellepeddy et al. | 726/26 |
| 2009/0135444 A1* | 5/2009 | Best et al. | 358/1.15 |
| 2009/0144619 A1* | 6/2009 | Best et al. | 715/277 |

FOREIGN PATENT DOCUMENTS

WO    WO 2006104810 A2 * 10/2006

OTHER PUBLICATIONS

Abdulaziz et al., Oasis Legal XML Member Section XML Court Document 1.1 Proposed Specification, p. 1-82, Oct. 1, 2002, retrieved from http://www.oasis-open.org/committees/legalxml-courtfiling/documents/court_document/courtdocument11.pdf.*

Manes et al., A Framework for Redacting Digital Information From Electronic Devices, p. 56-60 (IEEE, Proceedings of the 2007 IEEE Workshop on Information Assurance, West Point, NY, Jun. 20-22, 2007).*

AutoRedact Plug-in for Adobe / Advanced Redacting Solution for PDF Documents Copyright 1999-2010, pp. 1-6 http://www.evermap.com/autoredact.asp.

Redaction of Confidential Information in Electronic Documents, Copyright 2006, pp. 1-13 http://www.adobe.com/devnet/acrobat/pdfs/Redaction.pdf.

Redact-It Enterprise Server Copyright 2010, p. 1 http://www.redact-it.com/dedactit_server.html.

TeraDact Automated Redaction Engine Copyright 2008, 2 pages http://celcorp.com/Celcorp.TeraDact.pdf.

* cited by examiner

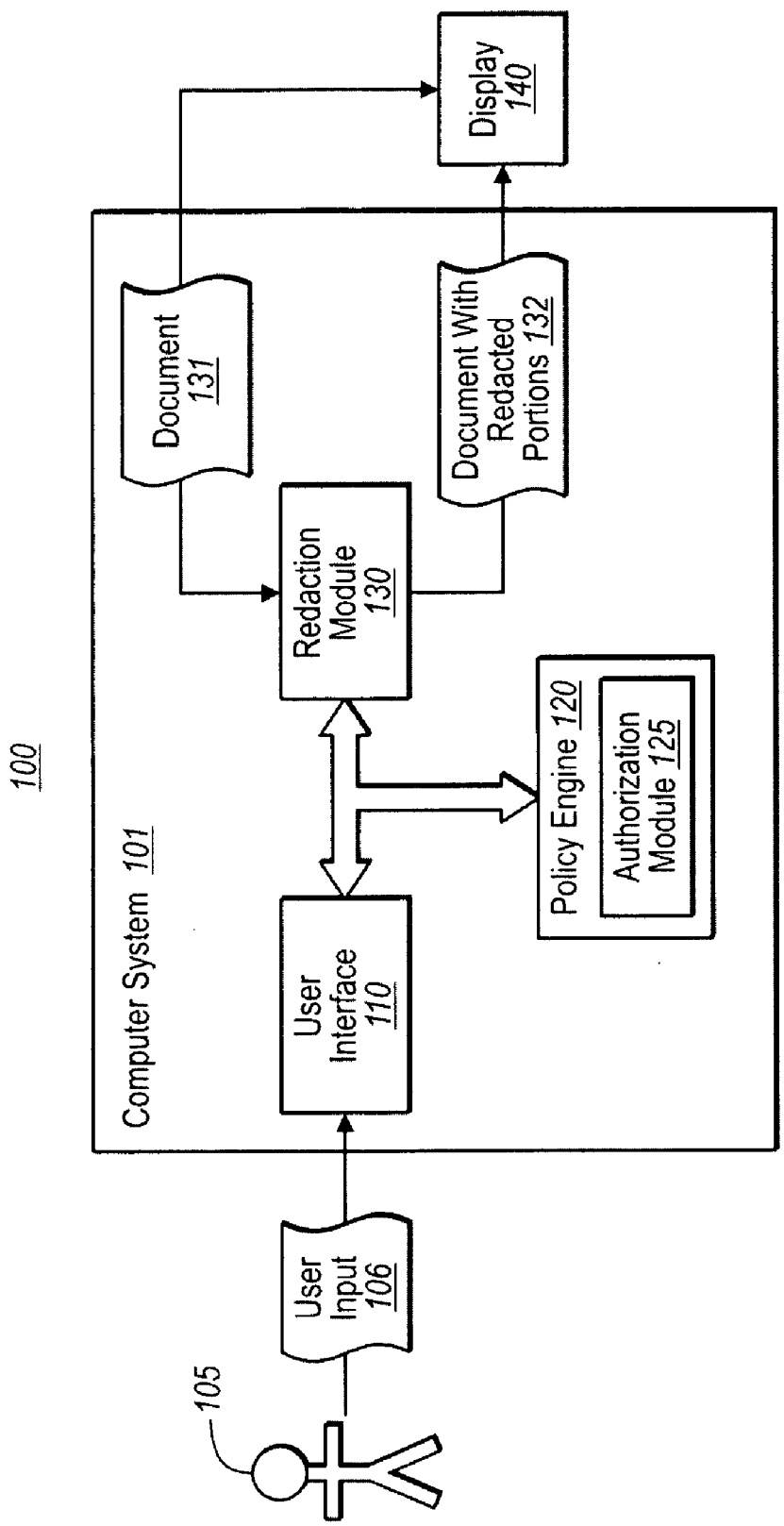

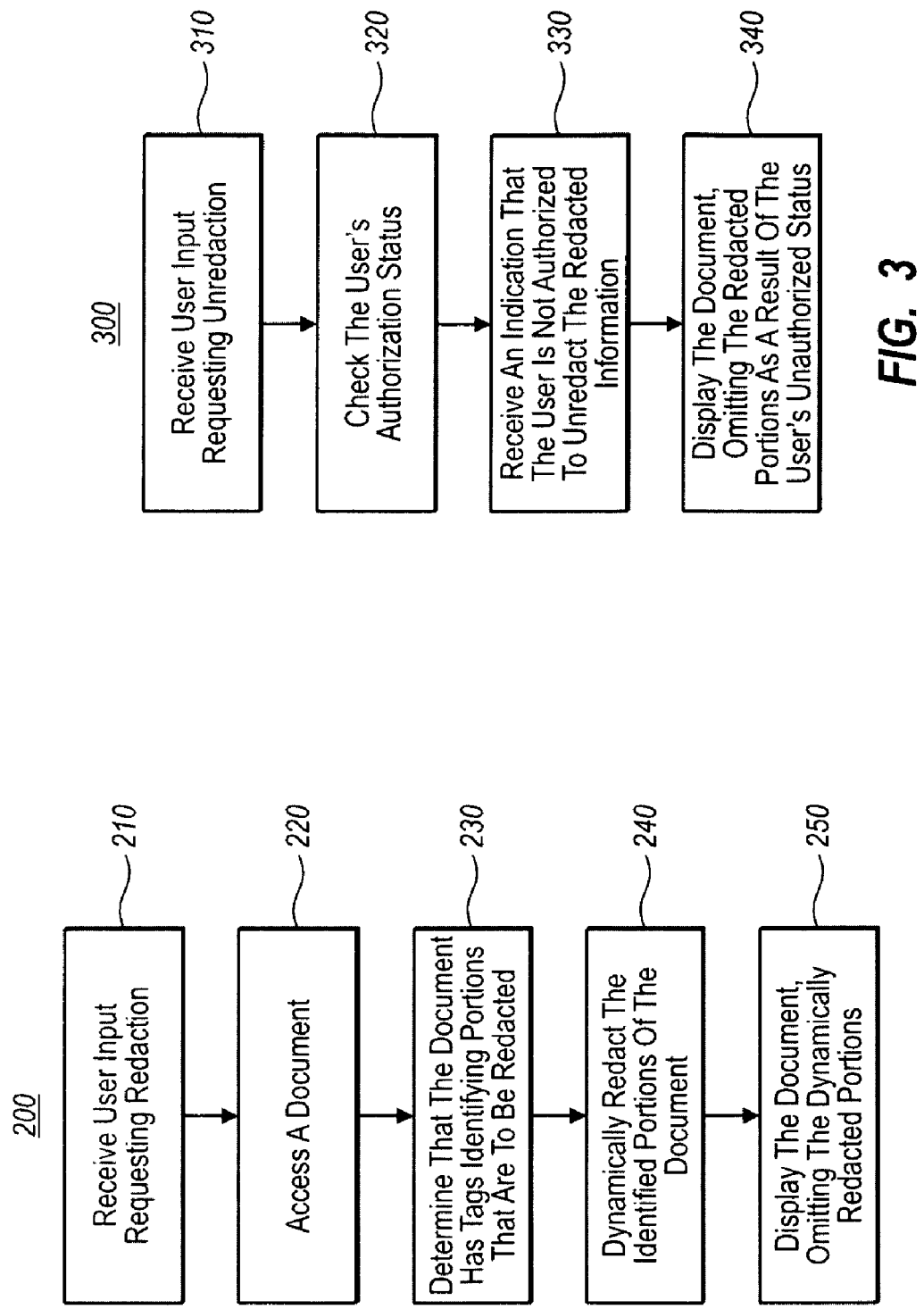

SELECTIVE DOCUMENT REDACTION

BACKGROUND

With the proliferation of computing systems, in all their various forms, public use of such systems has become an everyday occurrence. Many times, users will view the information displayed by their computers in such a way that the information may be viewed by other people in the devices immediate area. In most cases, the information is not highly personal or confidential and thus, the user may not care whether others see the information on their screen.

In other situations, however, the information may be of a more sensitive or private nature. Such information may include personal finance information, corporate account information or other data that is best kept to the eyes of the owner of that information. In order to ease such concerns, computing devices or software programs running on the computing devices may have document redaction mechanisms that remove the document from view. For instance, if a user was viewing a sensitive document in public and determined that others were attempting to view the documents on the user's computer, the user may be able to implement the redaction mechanism to remove the document from view entirely.

Many times, however, some portions of a document are less sensitive than others. Thus, a user may wish to view the less sensitive portions of the document while in public, and view the sensitive material at another time or place more conducive to such viewing. Current redaction mechanisms, however, are limited in how they are able to redact material from a computer's display. Either the document is displayed in its entirety or is completely removed from view. There is no middle ground.

BRIEF SUMMARY

Embodiments described herein are directed to selectively redacting display information in accordance with a redaction policy. In one embodiment, a computer system receives user input indicating a user's intention to selectively redact portions of accessed documents. The computer system accesses at least one document, such that the document is capable of being displayed to the user. The computer system determines that the accessed document comprises one or more tags indicating which portions of the document are to be redacted. The computer system dynamically redacts those portions of the document identified by the tags without otherwise altering the structure of the document, in accordance with the user's intention. The computer system also displays the document according to the document's original structure, omitting the dynamically redacted portions.

In other embodiments, a computer system performs a method for selectively unredacting display information in accordance with a redaction policy based, at least in part, on the user's identity. The computer system receives a user input indicating the user's intention to selectively unredact a portion of redacted display information representing a document on the computer. The computer system checks the user's authorization status to determine whether the user is authorized to unredact the redacted display information in the document. The computer system receives an indication that the user is not authorized to unredact the redacted display information. The computer system displays the document according to the document's original structure, omitting the dynamically redacted portions as a result of the user's unauthorized status, notwithstanding the user's request to unredact the redacted information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIG. 1 illustrates a computer architecture in which embodiments of the present invention may operate including selectively redacting display information in accordance with a redaction policy and selectively unredacting a portion of display information in accordance with a redaction policy based, at least in part, on the user's identity.

FIG. 2 illustrates a flowchart of an example method for selectively redacting at least a portion of display information in accordance with a redaction policy.

FIG. 3 illustrates a flowchart of an example method for selectively unredacting a portion of display information in accordance with a redaction policy based, at least in part, on the user's identity.

DETAILED DESCRIPTION

Figure 4:
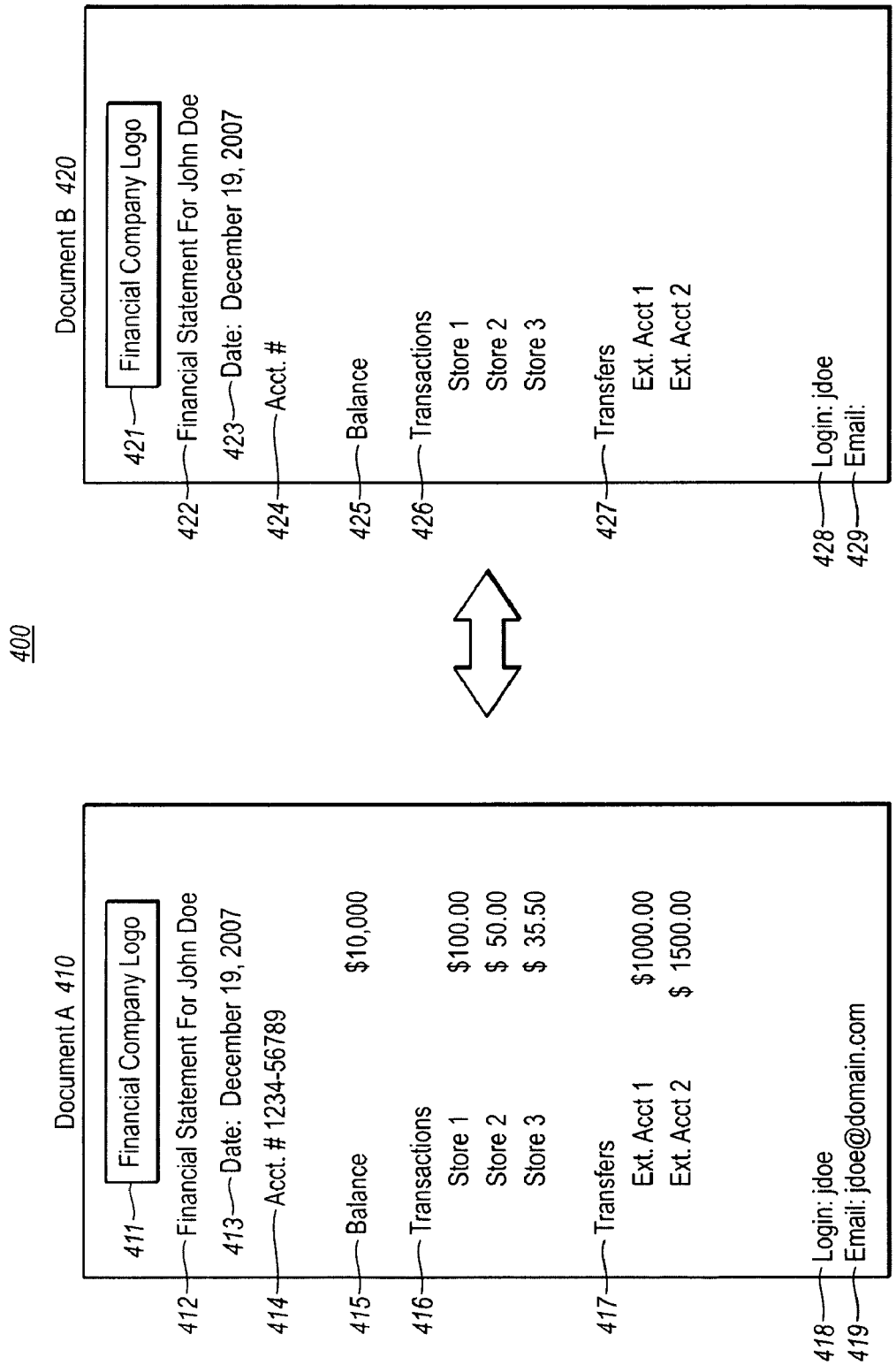
FIG. 4 illustrates an exemplary embodiment of the present invention in which information has been dynamically redacted from a document.

Embodiments described herein are directed to selectively redacting display information in accordance with a redaction policy. In one embodiment, a computer system receives user input indicating a user's intention to selectively redact sensitive portions of accessed documents. The computer system accesses at least one document, such that the document is capable of being displayed to the user. The computer system determines that the accessed document comprises one or more tags indicating which portions of the document are sensitive. The computer system dynamically redacts those sensitive portions of the document identified by the tags without otherwise altering the structure of the document, in accordance with the user's intention. The computer system also displays the document according to the document's original structure, omitting the dynamically redacted portions.

In other embodiments, a computer system performs a method for selectively unredacting display information in accordance with a redaction policy based, at least in part, on the user's identity. The computer system receives a user input indicating the user's intention to selectively unredact a portion of redacted sensitive display information representing a document on the computer. The computer system checks the user's authorization status to determine whether the user is authorized to unredact the redacted sensitive display information in the document. The computer system receives an indication that the user is not authorized to unredact the redacted sensitive display information. The computer system displays the document according to the document's original structure, omitting the dynamically redacted portions as a result of the user's unauthorized status, notwithstanding the user's request to unredact the redacted information.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes computer system 101. In some embodiments, computer system 101 may include user interface 110. User interface (UI) 110 may include any type of software interface that allows a user to interact with computer system 101 and/or a software application running on computer system 101. UI 110 may allow various types of user inputs (e.g. user input 106) including mouse clicks, key strokes from a keyboard, voice commands, touch screen inputs, or any other type of input that could indicate a user's intentions. User 105 may be any type of computer user including a developer, a client/end-user, system administrator or other computer user.

In some embodiments, computer system 101 also includes redaction module 130. Redaction module 130 is configured to redact portions of information from a document. Typically, documents such as document 131 are displayed (e.g. on display 140) in their entirety. That is, each element in the document's structure is accessed and displayed. In some cases, it is desirable to redact certain portions of information contained in the document while not redacting other portions. In some embodiments, this data redaction occurs without affecting the structure of the document. For example, if a user is viewing bank account information in an internet browser, it may be desirable for the user to redact certain sensitive portions of the information being displayed. This is particularly true when a user is in a public setting. According to some embodiments of this invention, information such as the user's account number, login ID, dollar values and other information may be dynamically redacted upon receiving a user input indicating that such a redaction is to occur.

Thus, in some cases, redaction module 130 may be configured to redact certain portions of information from document 131, which results in document with redacted portions 132. Document with redacted portions 132 may be displayed in addition to, or in place of document 131 on display 140. Display 140 may be any type of display device configured to receive and display electronic input.

Computer system 101 may also include policy engine 120 with authorization module 125. Policy engine 120 may be configured to run policies which may include interaction with an operating system. For example, user interface 110 may receive user input 106 indicating that the user wished to redact sensitive portions of the document that is about to be or is currently being viewed. Policy engine 120 may receive a request from redaction module 130 to determine whether user 105 is authorized to redact or unredact sensitive portions of information in the document. Authorization module 125 may check with computer system 101 and/or an operating system running on computer system 101 to determine whether user 105 is authorized to perform the redaction. Policy engine 120 may then indicate to redaction module 130 whether user 105 is authorized or unauthorized.

Additionally or alternatively, policy engine 120 may be configured to apply a policy that is configured to perform the actual information redaction. For example, in some cases, document 131 may be embedded with one or more tags that indicate which portions of the document are sensitive. Policy engine 120 may run a policy that is configured to redact those portions of information indicated as sensitive by the embedded tags. The policy may process the entire document, or may be configured to process only those portions currently being displayed. Furthermore, policy engine 120 may be configured to automatically run such a policy to redact the sensitive portions of information when user 105 navigates to different portions of the document. In some cases, this may conserve processing resources by avoiding processing portions of the document that aren't viewed by the user. This and other functionality will be explained in greater detail below with reference to FIGS. 2, 3 and 4.

FIG. 2 illustrates a flowchart of a method 200 for selectively redacting at least a portion of display information in accordance with a redaction policy. The method 200 will now be described with frequent reference to the components and data of environment 100 of FIG. 1 and the exemplary embodiment 400 of FIG. 4.

Method 200 includes an act of receiving user input indicating a user's intention to selectively redact portions of accessed documents (act 210). For example, user interface 10 may receive user input 106 from user 105 indicating the user's intention to selectively redact sensitive portions of accessed documents (e.g. document 131). In some cases, the user input may include activation of a hot key on a keyboard. Such a hot key may be user-programmable to redact and unredact upon activation of the key. In some embodiments, a user may be able to program multiple hot keys where each hot key corresponds to a different sensitivity level.

For example, in documents that have multiple different portions of information of varying level of sensitivity, the user may be able to assign one hot key to low-sensitivity-redaction, medium, high, or any other user-defined sensitivity level. Furthermore, the user may be able to define which information is to be redacted corresponding to the sensitivity level. For instance, user 105 may determine that low-sensitivity information such as the user's name and email address are to be redacted upon selecting the "L" key. High-sensitivity information such as account numbers and dollar amounts, the "H" key. User inputs, hot keys, and sensitivity levels may all be customizable and changeable by the user.

Sensitive information may include any type of information including text, pictures, videos, audio portions or other consumable information. Examples of sensitive information may include, but is not limited to, the following: the user's name, address, social security number, telephone number, alias, email address, photograph, account number, or any audio or video representation of the same. Other information not usually deemed sensitive, but that is sensitive to the user, may also be redacted as sensitive. Documents where redaction may be used may include, but are not limited to, the following: websites, word processing documents, spreadsheets, slide shows, financial portfolios, financial statements, legal forms, letters, memos, emails or any other type of file or document that may be displayed to a user and that may contain sensitive information.

As explained above, sensitive portions of a document may be determined by user 105. Additionally or alternatively, sensitive portions of a document may be determined by the document's author. For example, within the structure of the document, the author may include various tags identifying portions of the document as sensitive or potentially sensitive. Thus, when a user provides an input indicating a desire to redact portions of the document, those portions of the document tagged as sensitive may be redacted. In some cases, where a user has configured a tiered system with multiple sensitivity levels, only those portions of the document corresponding to the indicated sensitivity level are redacted. For instance, if a user input indicated that only the low-sensitivity portions were to be redacted, only those items identified by the user as low-sensitivity items would be redacted. The same is true for medium, high or any other user-customized sensitivity-level. In some cases, the user may communicate with the document's author to indicate which portions of information are to be tagged as sensitive. Then, when the user indicates a redaction is to occur, only those portions indicated as sensitive to that user will be redacted.

Sensitivity may also be based on the user's current context. For example, computer system 101 may be configured to determine the user's current location using global positioning system (GPS), or determine based on ambient noise level that the user is in a public setting. Other means of determining context may also be used, and each may affect the sensitivity level in a different manner. For example, computer system 101 may be a public kiosk and may automatically redact certain portions of information such as account numbers and social security numbers. Alternatively, a user may input their current context manually, which may correspond to a predefined sensitivity level. In some cases, computer system 101 may detect that a user is in a certain context and automatically raise the sensitivity level and redact sensitive portions accordingly.

Method 200 includes an act of accessing at least one document, such that the document is capable of being displayed to the user (act 220). For example, computer system 101 may access document 131 to display the document on display 140. As indicated above, the document may be any type of file that contains information organized in a structured fashion. Such files may include websites, word processing documents, spreadsheets, financial statements, emails or other types of documents.

Method 200 also includes an act of determining that the accessed document comprises one or more tags indicating which portions of the document are to be redacted (act 230). For example, computer system 101 may determine that accessed document 131 includes tags indicating which portions of the document 131 are sensitive and are to be redacted. In some cases, document 131 may be embedded with tags identifying one or more portions of the document that are to be redacted upon receiving a user redaction input. Thus, in cases where a redaction policy is used, the policy may simply search through the document for the tags and redact those portions of information identified by the tags.

Method 200 includes an act of dynamically redacting those portions of the document identified by the tags without otherwise altering the structure of the document, in accordance with the user's intention (act 240). For example, redaction module 130 may be configured to dynamically redact those sensitive portions of document 131 identified by the tags without otherwise altering the structure of the document, in accordance with user 105's intention. Thus, if user 105 is viewing, for instance, an email with a company's financial statement, those words, characters or sections that are indicated as sensitive may be redacted without altering the layout of the document. For example, word spacing, picture layout and other formatting may be left intact while only those portions that are sensitive are redacted. Alternatively, it may be desirable in some situations, to reformat the document's layout after redacting the sensitive portions. In such cases, the document may be automatically reformatted when the information is unredacted.

Method 200 includes an act of displaying the document according to the document's original structure, omitting the dynamically redacted portions (act 250). For example, display 140 may display document with redacted portions 132 according to the document's original structure, without the dynamically redacted portions. Similarly, user 105 may input another user input 106 (e.g. activation of a hot key) indicating the user's intention to display those sensitive portions of the document that were redacted. Upon receiving such an indication, redaction module 130 may unredact the redacted portions and display the document along with the dynamically redacted portions. In some embodiments, omitting the dynamically redacted portions may not involve entirely removing the portions from display, but rather obscuring or making the redacted portions unreadable.

As described in an exemplary embodiment 400 in FIG. 4, portions of data may be dynamically redacted when a user input is received. For example, Document A 410 may be a financial statement 412. The statement may include the financial company's logo 411, the date 413, the account number 414, current balance 415, transactions 416, transfers 417, login alias 418 and email address 419. As indicated above, user 105 may define or select which items or types of items are to be redacted. In this case, as shown in Document B 420, user 105 has selected to remove the account number, dollar values and email address (or has selected a sensitivity level which includes these items). Other items such as the user's name, the date and the user's login alias have not been redacted. These, of course, could have been redacted, had the user selected to remove those items or selected a security level that included those items. As shown in this example, the company logo 421, the user's name 422, the date 423 and the login alias are still shown. The balance amount 425, transaction amounts 426, transfer amounts 427 and email address 429 have been redacted. It should be noted that the structure of the document remains largely (if not completely) unchanged.

In some cases, visual markers may be provided where information has been redacted. Such markers would indicate to the user that portions of the document are not being displayed because of the redaction. Markers may be inserted in place of each field, each word, each character or other redacted portion, or may be inserted at the beginning or end of a string of redacted portions. Markers may be arranged or displayed in any manner, in any color, size, shape, transparency, or other design characteristic. In some cases, markers may be selected from a list and/or be completely customizable by the user.

FIG. 3 illustrates a flowchart of a method 300 for selectively unredacting a portion of display information in accordance with a redaction policy based, at least in part, on the user's identity. The method 300 will now be described with frequent reference to the components and data of environment 100 and exemplary embodiment 400 of FIG. 4.

Method 300 includes an act of receiving a user input indicating the user's intention to selectively unredact a portion of redacted display information representing a document on the computer (act 310). For example, user interface 110 may receive user input 106 indicating user 105's intention to selectively unredact a portion of redacted sensitive display information representing document 132 on display 140. Sensitive information may be dynamically redacted from documents upon receiving a user input. Upon receiving the same or an alternative input, those portions of sensitive information may be unredacted and thus displayed to the user. For instance, a user may redact sensitive portions by activating a hot key while in a public area and, upon moving to a more private area, unredact those sensitive portions using the same, or a different hot key or other input.

In some cases, document 131 may be embedded with one or more tags corresponding to sensitive portions of the document including. This may include annotating the substructure of document 131 with policy-recognizable markers that identify sensitive portions of the document. Policy engine 120 may use these policy-recognizable markers to identify those portions of the document that are deemed to be sensitive. These portions may include certain characters, numbers, words, phrases, pictures, videos or any other portion of a document.

Method 300 also includes an act of checking the user's authorization status to determine whether the user is authorized to unredact the redacted display information in the document (act 320). For example, authorization module 125 may check user 105's authorization status to determine whether user 105 is authorized to unredact the redacted sensitive display information in document 132. For example, a bank president may be viewing a document and may desire to redact certain portions of the document because other people have entered the room. If another user viewing the document attempted to unredact the sensitive redacted portions, the user's authorization status would be checked to determine that the user was authorized to unredact the redacted portions. This is an example of a security measure that may be taken to prevent unauthorized persons from viewing the redacted portions. Other time-based (e.g. authorized users are authorized to access the redacted information only within a certain time frame), location-based, rights-based security measures may also be used. Any type of authentication may be used to verify the user's authentication status.

In some cases, checking the user's authorization status to determine whether the user is authorized to unredact the redacted sensitive display information in the document includes sending a call to policy engine 120 to determine the authorization status of the user. Policy engine may communicate with computer system 101 and/or an operating system running on the system. Policy engine 120 may also communicate with services running on the operating system, or in some cases, may itself be a service running on an operating system. In some embodiments, user 105 may be permitted to grant authorization status to other users. Thus, once the users are authorized, they may be able to unredact sensitive portions of the document that have been redacted.

Method 300 includes an act of receiving an indication that the user is not authorized to unredact the redacted display information (act 330). For example, redaction module 130 may receive an indication that user 105 is not authorized to unredact the redacted sensitive display information in document with redacted portions 132. Redaction module 130 may be configured to apply a policy that redacts sensitive portions of a document as well as be configured to remove that policy. Either or both of the application or removal of the redaction policy may be based on the user's identity, authentication status, security clearance or any other factor that could be used to determine whether the user was one who is permitted to view the redacted information. Other time- or context-based security measures may also be used to ensure the user's authorized status.

Method 300 includes an act of displaying the document according to the document's original structure, omitting the dynamically redacted portions as a result of the user's unauthorized status, notwithstanding the user's request to unredact the redacted information (act 340). For example, display 140 may display document 132 according to the document's original structure, omitting the dynamically redacted portions as a result of user 105's unauthorized status, even though the user requested to unredact the redacted information. In some cases, when and if the user's authorization status changes to authorized, the user may unredact the redacted information, upon which the document will be displayed with all of the original content in its original structure.

Thus, a user may dynamically redact and unredact sensitive portions of a document on-the-fly. In some embodiments, the user may define and/or select which elements are deemed to be sensitive. Furthermore, a user's authorization status may be checked to determine whether the user is authorized to redact or unredact the document's sensitive information.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented within a computer system that includes at least one processor and memory storing instructions which, when executed by the at least one processor, implement the method for selectively redacting at least a portion of display information in accordance with a redaction policy, the method comprising:
   an act of a computer system receiving user input indicating a user's intention to selectively redact portions of accessed documents, wherein the user input comprises a hot key activation on the computer system corresponding to one of a plurality of multi-tier sensitivity levels, wherein each of the plurality of multi-tier sensitivity levels corresponds to a particular hot key activation, the computer system including at least one processor;
   an act of the computer system accessing at least one document, such that the document is capable of being displayed to the user;
   an act of the computer system determining that the accessed document comprises tag information that identifies portions of the document to redact upon receiving the hot key activation, including:
      one or more first tags indicating first portions of the document that are to be redacted based on the identity of a first sensitivity level of the plurality of multi-tier sensitivity levels when the hot key activation is a first hot key activation, and
      one or more second tags indicating second portions of the document that are to be redacted based on the identity of a second sensitivity level of the plurality of multi-tier sensitivity levels when the hot key activation is a second hot key activation;
   an act of the computer system identifying portions of the document that are to be redacted based on particular one or more tags in the tag information that are identified by one of the plurality of multi-tier sensitivity levels corresponding to the hot key activation;
   an act of the computer system dynamically redacting those portions of the document identified by the particular one or more tags without otherwise altering the structure of the document, in accordance with the user's intention including the hot key activation; and
   an act of the computer system displaying the document according to the document's original structure, omitting any dynamically redacted portions.

2. The method of claim 1, further comprising:
   an act of the computer system receiving a second user input indicating the user's intention to display the previously redacted portions of the document; and
   an act of the computer system displaying the document along with the previously redacted portions.

3. The method of claim 1, wherein at least one of the portions to be redacted includes information indicated as sensitive by the user.

4. The method of claim 1, wherein at least one of the portions to be redacted includes a portion that has a policy assigned to it such that the portion is subject to redaction.

5. The method of claim 1, further comprising:
   an act of the computer system receiving a user input indicating the user's intention to navigate to another portion of the document; and
   an act of the computer system automatically applying the redaction to the document according to the tags as the user navigates.

6. The method of claim 1, wherein the user determines which portions of the document are to be redacted.

7. The method of claim 1, wherein the document's author determines which portions of the document are to be redacted.

8. The method of claim 1, further comprising an act of providing one or more visual markers to the user to indicate those portions of the document where information has been redacted.

9. The method of claim 1, wherein the omitting the dynamically redacted portions comprises making the redacted portions unreadable.

10. The method of claim 1, wherein the act of the computer system dynamically redacting those portions of the document identified by the particular one or more tags without otherwise altering the structure of the document further comprises:
    an act of checking the user's authorization status to determine whether the user is authorized to unredact the redacted display information in the document;
    an act of receiving an indication whether the user is authorized or unauthorized to unredact the redacted display information; and
    an act of excluding those portions of the document identified by the particular one or more tags from those portions that are dynamically redacted as a result of the user's unauthorized status, notwithstanding the user's request to unredact the redacted information, or alternatively, an act of including those portions of the document identified by the particular one or more tags in those portions that are dynamically redacted as a result of the user's authorized status.

11. The method of claim 10, wherein authorized users are authorized to access the redacted information according to conditions defined in an associated redaction policy.

12. The method of claim 10, wherein the act of act of checking the user's authorization status to determine whether the user is authorized to unredact the redacted display information in the document comprises sending a call to a policy engine to determine the authorization status of the user.

13. The method of claim 1, wherein the hot key activation comprises the first hot key activation and wherein the act of the computer system displaying the document according to the document's original structure, omitting any dynamically redacted portions, comprises omitting the first portions of the document.

14. The method of claim 1, wherein the hot key activation comprises the second hot key activation and wherein the act of the computer system displaying the document according to the document's original structure, omitting any dynamically redacted portions, comprises omitting the second portions of the document.

15. The method of claim 14, wherein the second portions include the first portions, and wherein omitting any dynamically redacted portions further comprises omitting the first portions of the document.

16. The method of claim 1, further comprising:
an act of the computer system determining a context of the user; and
an act of the computer system determining that the user is unauthorized to dynamically redact portions of the document based on the context of the user.

17. The method of claim 16, wherein the context comprises at least one of the user's current GPS location, an ambient noise level, and a status indicating whether or not the computer system comprises a public kiosk.

18. The method of claim 1, wherein the act of the computer system identifying portions of the document that are to be redacted based on particular one or more tags in the tag information that are identified by one of the plurality of multi-tier sensitivity levels corresponding to the hot key activation comprises:
based on a context of the user, selecting particular one or more tags that identify a larger portions of the document to be redacted than would be identified based on the hot key activation alone.

19. A computer storage device having stored thereon computer executable instructions that, when executed by at least one processor of a computer system, implement a method for selectively redacting at least a portion of display information in accordance with a redaction policy, the method comprising:
an act of a computer system receiving user input indicating a user's intention to selectively redact portions of accessed documents, wherein the user input comprises a hot key activation on the computer system corresponding to one of a plurality of multi-tier sensitivity levels, wherein each of the plurality of multi-tier sensitivity levels corresponds to a particular hot key activation, the computer system including at least one processor;
an act of the computer system accessing at least one document, such that the document is capable of being displayed to the user;
an act of the computer system determining that the accessed document comprises tag information that identifies portions of the document to redact upon receiving the hot key activation, including:
one or more first tags indicating first portions of the document that are to be redacted based on the identity of a first sensitivity level of the plurality of multi-tier sensitivity levels when the hot key activation is a first hot key activation, and:
one or more second tags indicating second portions of the document that are to be redacted based on the identity of a second sensitivity level of the plurality of multi-tier sensitivity levels when the hot key activation is a second hot key activation;
an act of the computer system identifying portions of the document that are to be redacted based on particular one or more tags in the tag information that are identified by one of the plurality of multi-tier sensitivity levels corresponding to the hot key activation;
an act of the computer system dynamically redacting those portions of the document identified by the particular one or more tags without otherwise altering the structure of the document, in accordance with the user's intention including the hot key activation; and
an act of the computer system displaying the document according to the document's original structure, omitting any dynamically redacted portions.

20. The computer storage device of claim 19, further comprising:
an act of the computer system receiving a second user input indicating the user's intention to display those sensitive portions of the document that were redacted; and
an act of the computer system displaying the document along with the previously redacted portions.

21. A computer system comprising:
at least one processor; and
one or more computer storage media having stored thereon computer executable instructions that, when executed by the at least one processor, implement a method for selectively redacting at least a portion of display information in accordance with a redaction policy, the method comprising:
an act of the computer system receiving user input indicating a user's intention to selectively redact portions of accessed documents, wherein the user input comprises a hot key activation on the computer system corresponding to one of a plurality of multi-tier sensitivity levels, wherein each of the plurality of multi-tier sensitivity levels corresponds to a particular hot key activation;
an act of the computer system accessing at least one document, such that the document is capable of being displayed to the user;
an act of the computer system determining that the accessed document comprises tag information that identifies portions of the document to redact upon receiving the hot key activation, including:
one or more first tags indicating first portions of the document that are to be redacted based on the identity of a first sensitivity level of the plurality of multi-tier sensitivity levels when the hot key activation is a first hot key activation, and;
one or more second tags indicating second portions of the document that are to be redacted based on the identity of a second sensitivity level of the plurality of multi-tier sensitivity levels when the hot key activation is a second hot key activation;
an act of the computer system identifying portions of the document that are to be redacted based on particular one or more tags in the tag information that are identified by one of the plurality of multi-tier sensitivity levels corresponding to the hot key activation;
an act of the computer system dynamically redacting those portions of the document identified by the particular one or more tags without otherwise altering the structure of the document, in accordance with the user's intention including the hot key activation; and
an act of the computer system displaying the document according to the document's original structure, omitting any dynamically redacted portions.

* * * * *